United States Patent
Hirose (10) Patent No.: US 7,943,852 B2
(45) Date of Patent: May 17, 2011

(54) SUPERCONDUCTING CABLE

(75) Inventor: Masayuki Hirose, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 914 days.

(21) Appl. No.: 11/883,068

(22) PCT Filed: Dec. 16, 2005

(86) PCT No.: PCT/JP2005/023179
§ 371 (c)(1),
(2), (4) Date: Jul. 26, 2007

(87) PCT Pub. No.: WO2006/098068
PCT Pub. Date: Sep. 21, 2006

(65) Prior Publication Data
US 2008/0164048 A1 Jul. 10, 2008

(30) Foreign Application Priority Data

Mar. 14, 2005 (JP) .................................. 2005-072046

(51) Int. Cl.
*H01B 12/00* (2006.01)
(52) U.S. Cl. ...................... 174/125.1; 505/230; 307/147
(58) Field of Classification Search .............. 174/125.1, 174/15.4, 15.5; 29/599; 505/230, 231
See application file for complete search history.

(56) References Cited

U.S. PATENT DOCUMENTS

| 6,985,761 | B2 * | 1/2006 | Mele | 505/231 |
| 2002/0148101 | A1 * | 10/2002 | Hirose et al. | 29/599 |
| 2004/0216915 | A1 | 11/2004 | Hirose | |

FOREIGN PATENT DOCUMENTS

| CN | 1518009 | | 8/2004 |
| JP | 2-299108 | | 12/1990 |
| JP | 02003031049 | * | 1/2003 |
| JP | 2003-087651 | | 7/2003 |
| JP | 2003-249130 | | 9/2003 |

* cited by examiner

*Primary Examiner* — Ishwarbhai B Patel
(74) *Attorney, Agent, or Firm* — Drinker Biddle & Reath LLP (57) ABSTRACT

A superconducting cable has a further decreased diameter, and a DC transmission system incorporates the cable. The superconducting cable has a structure in which two cable cores, each having a superconducting conductor layer and an outer superconducting layer, are twisted together and housed in a heat-insulated pipe. Each cable core has a former, superconducting conductor layer, insulating layer, outer superconducting layer, and a protecting layer in this order from the center. In unipolar transmission, the superconducting conductor layers of both cores are used as the outward line and the outer superconducting layers of both cores as the return line. In bipolar transmission, the superconducting conductor layer of one core is used for the transmission for the positive pole, the superconducting conductor layer of the other core is used for the transmission for the negative pole, and the outer superconducting layers of both cores are used as the neutral-line layers.

11 Claims, 3 Drawing Sheets

SUPERCONDUCTING CABLE

TECHNICAL FIELD

The present invention relates to a superconducting cable formed by twisting a plurality of cable cores together and to a DC transmission system incorporating the superconducting cable. The present invention particularly relates to a superconducting cable that can further reduce its diameter.

BACKGROUND ART

Figure 4:
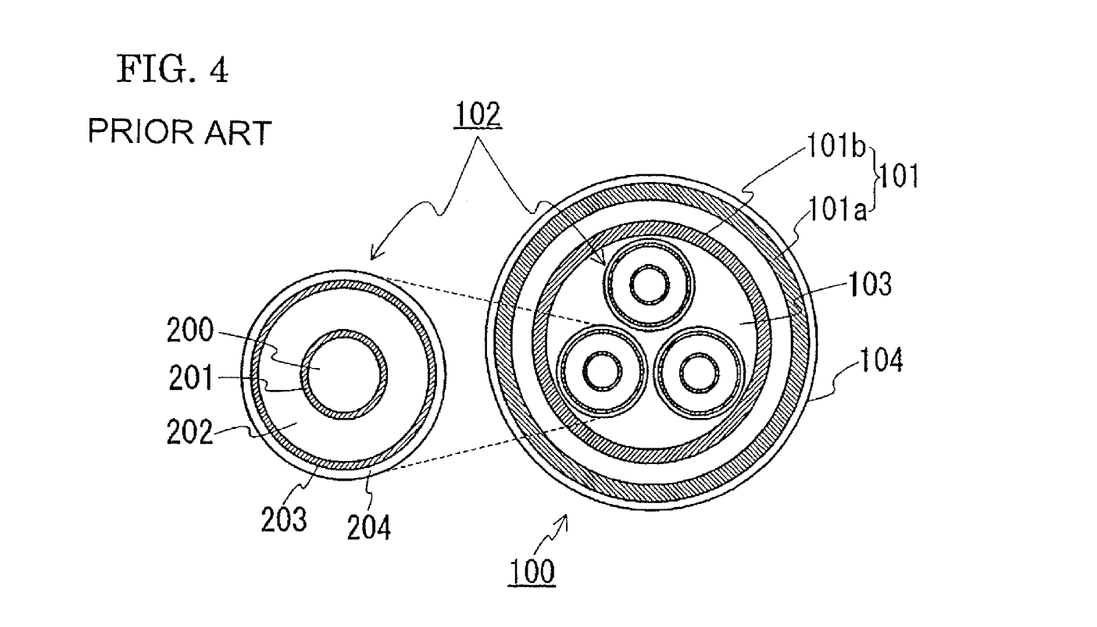
FIG. 4 is a cross-sectional view of a three-core-twisted-type superconducting cable for the three-phase AC use.

As an AC superconducting cable, a three-core-twisted-type cable is commonly known that is formed by twisting three cable cores together. FIG. 4 is a cross-sectional view of a three-core-twisted-type cable for the three-phase AC use. A superconducting cable 100 has a structure in which three cable cores 102 are twisted together and housed in a heat-insulated pipe 101. The heat-insulated pipe 101 has a dual-pipe structure composed of an outer pipe 101a and an inner pipe 101b, between which a heat-insulating material (not shown) is placed. The space between the outer pipe 101a and the inner pipe 101b is evacuated in vacuum. An anticorrosion covering 104 is provided on the outer circumference of the heat-insulated pipe 101. Each of the cable cores 102 comprises, from the center in the following order, a former 200, a superconducting conductor layer 201, an insulating layer 202, a superconducting shielding layer 203, and a protecting layer 204. A space 103 enclosed by the inner pipe 101b and the cable cores 102 forms a channel for a coolant such as liquid nitrogen.

When AC transmission is performed by using the above-described superconducting cable, not only is AC loss caused due to the inductance but also current at the time of the short circuiting is large, so that the temperature may rise excessively due to the loss at that moment. In contrast to the AC transmission, DC transmission using a superconducting cable not only eliminates the AC loss but also decreases the short circuit current. As a DC superconducting cable, Patent literature 1 has proposed a superconducting cable formed by twisting together three cable cores, each having a superconducting conductor and an insulating layer. In this superconducting cable, the individual cores are respectively used as a positive-pole core, a negative-pole core, and a neutral-line core to perform bipolar transmission.

Patent literature 1: the published Japanese patent application Tokukai 2003-249130.

DISCLOSURE OF THE INVENTION

Problem to be Solved by the Invention

In the superconducting cable disclosed in the foregoing Patent literature 1, the use of one cable enables the bipolar transmission. However, this cable is provided with no less than three cable cores in one cable, thereby increasing the cable diameter. Consequently, depending on the installation space, there is a possibility that this cable cannot be applied. Therefore, for performing DC transmission, it is desired to develop a superconducting cable that can further reduce the cable diameter. In addition, the AC superconducting cable shown in FIG. 4 is also provided with three cores in one cable. Consequently, this cable has a large cable diameter as with the cable described in the above-described Patent literature 1.

In view of the above circumstance, a main object of the present invention is to offer a superconducting cable that has a smaller cable diameter. Another object of the present invention is to offer a superconducting cable suitable for the DC transmission. Yet another object is to offer a DC transmission system incorporating the above-described superconducting cable.

Means to Solve the Problem

The present invention attains the foregoing object by decreasing the number of cores provided in one cable.

More specifically, a superconducting cable of the present invention has a feature in that the cable is structured by twisting together two cable cores, each having the following members:
 (a) a superconducting conductor layer;
 (b) an insulating layer provided on the outer circumference of the foregoing superconducting conductor layer; and
 (c) an outer superconducting layer provided on the outer circumference of the foregoing insulating layer.

A DC transmission system of the present invention is a transmission system incorporating the above-described superconducting cable and carries out the transmission by using the superconducting conductor layer and outer superconducting layer provided in the core as described below.

(Unipolar Transmission)

The superconducting conductor layers provided in both cores are used as the outward line, and the outer superconducting layers provided in both cores are used as the return line.

(Bipolar Transmission)

The superconducting conductor layer provided in one of the cores is used to perform the transmission for one pole; either the positive pole or the negative pole. The superconducting conductor layer provided in the other core is used to perform the transmission for the other pole. The outer superconducting layers provided in both cores are used as the neutral line.

In the AC superconducting cable shown in FIG. 4 described above and the DC superconducting cable described in Patent literature 1, in order to obtain an allowance for contraction for the cable cores at the time of the cooling, the cables have a structure in which three cores are twisted together with a slack provided. However, the structure having three cores in one cable cannot avoid an increase in cable diameter.

For example, a calculation is made below for a DC superconducting cable having a structure in which three cable cores are each provided with a former, superconducting conductor layer, insulating layer, shield layer made of copper, and protecting layer in this order from the center. In this cable, the individual cores are respectively used as a positive-pole core, a negative-pole core, and a neutral-line core. It is assumed that the superconducting conductor layer including the former has a diameter of 20 mm, the insulating layer has a thickness of 5 mm, the shield layer has a thickness of 1 mm, and the protecting layer has thickness of 2 mm. Then, the envelope circle of the three cores comes to have a diameter of about 77.6 mm $((36/\sqrt{3}+18)\times2\approx77.6)$. In addition, when a slack is provided by placing a spacer having a thickness of 5 mm between the neighboring cores, the envelope circle comes to have a diameter of about 83.3 mm $((41/\sqrt{3}+18)\times2\approx83.3)$.

On the other hand, in a DC superconducting cable, when the shield layer is formed using superconducting material to be used as an outer superconducting layer and then the outer superconducting layer is used as a return line or a neutral-line layer, the number of cores can be two. The two-core cable can have a cable diameter smaller than that of the above-described superconducting cable having three cores. For example, as with the foregoing calculation, another calculation is made below for a superconducting cable having a structure in which two cable cores are each provided with a former, superconducting conductor layer, insulating layer, outer superconducting layer, and protecting layer in this order from the center. In this cable, the superconducting conductor layers of the individual cores are respectively used for the transmission for the positive and negative poles, and the outer superconducting layers of both cores are used as the neutral-line layers. It is assumed that the superconducting conductor layer including the former has a diameter of 20 mm, the insulating layer has a thickness of 5 mm, the outer superconducting layer has a thickness of 1 mm, and the protecting layer has thickness of 2 mm. Then, the envelope circle of the two cores comes to have a diameter of 72 mm ((20+5×2+1×2+2×2)×2=72). In addition, when a slack is provided by placing a spacer having a thickness of 5 mm between the cores, the envelope circle has a diameter of 77 mm (72+5=77). As described above, when the two-core structure is employed, the cable diameter can be smaller than that of the above-described superconducting cable having a structure in which three cable cores are twisted together.

For an AC superconducting cable, also, three-phase AC transmission can be performed by using a plurality of superconducting cable having two cable cores, and concurrently the cable diameter of one cable can be decreased.

Consequently, the present invention specifies that the number of cores is two. The present invention is explained below in more detail.

A superconducting cable of the present invention is specified to be formed by twisting together two cable cores, each having the following members:
 (a) a superconducting conductor layer;
 (b) an insulating layer provided on the outer circumference of the foregoing superconducting conductor layer; and
 (c) an outer superconducting layer provided on the outer circumference of the foregoing insulating layer.

In particular, in the present invention, for unipolar transmission, the outer superconducting layer is used as the return line, and for bipolar transmission, the outer superconducting layer is used to circulate an imbalanced current between the positive and negative poles or an abnormal current. Therefore, the outer superconducting layer is formed by using a superconducting material.

It is recommended that the superconducting conductor layer be formed by helically winding tape-shaped wires having a structure in which a plurality of filaments made of, for example, a Bi-2223-based superconducting material are placed in a matrix such as a silver sheath. The superconducting conductor layer may either be a single layer or be composed of multiple layers. When a multilayer structure is employed, an insulating layer may be provided between the constituent superconducting layers. The insulating layer between the constituent superconducting layers may be provided, for example, by helically lapping insulating paper, such as kraft paper, or semisynthetic insulating paper, such as PPLP (registered trademark, produced by Sumitomo Electric Industries, Ltd.) (PPLP is the abbreviation of polypropylene-laminated paper). The above-described superconducting conductor layer is formed by helically winding the foregoing wires made of a superconducting material on the outer circumference of a former. The former may either be a solid body or a hollow body formed by using a metallic material such as copper or aluminum. For example, it may have a structure in which a plurality of copper wires are stranded. As the copper wires, wires having an insulating coating may be used. The former functions as a member for maintaining the shape of the superconducting conductor layer. A cushion layer may be provided between the former and the superconducting conductor layer. The cushion layer avoids the direct metallic contact between the former and the superconducting wires to prevent the superconducting wires from being damaged. In particular, when the former is formed by stranded wires, the cushion layer also functions to further smooth the surface of the former. As a specific material for the cushion layer, insulating paper or carbon paper can be suitably used.

The insulating layer may be formed by helically lapping semisynthetic insulating paper, such as PPLP (registered trademark), or insulating paper, such as kraft paper. The insulating layer is designed to have an insulating strength needed for the insulation between the superconducting conductor layer and the ground.

When a superconducting cable of the present invention is used for DC transmission, the above-described insulating layer may be structured with a $\rho$ (resistivity) grading to flatten the radial (thicknesswise) distribution of the DC electric field. The $\rho$ grading is performed such that as the radial position moves toward the innermost portion of the insulating layer, the resistivity decreases, and as the radial position moves toward the outermost portion, the resistivity increases. The performing of the $\rho$ grading varies the resistivity of the insulating layer thicknesswise in steps. This $\rho$ grading can flatten the thicknesswise distribution of the DC electric field throughout the insulating layer. As a result, the insulating thickness can be decreased. Consequently, the $\rho$ grading is desirable because it further decreases the cable diameter. The number of layers each having a different resistivity is not particularly limited. Practically, however, two or three layers or so are employed. In particular, when the thicknesses of the individual layers are equalized, the flattening of the distribution of the DC electric field can be effectively performed.

To perform the $\rho$ grading, it is recommendable to use insulating materials having different resistivities ($\rho$'s). For example, when insulating paper, such as kraft paper, is used, the resistivity can be varied, for example, by varying the density of the kraft paper or by adding dicyandiamide to the kraft paper. When composite paper, such as PPLP (registered trademark), composed of insulating paper and plastic film is used, the resistivity can be varied either by varying the ratio, k, of the thickness, tp, of the plastic film to the total thickness, T, of the composite paper (the ratio, k, is expressed as (tp|T)× 100) or by varying the density, quality, additive, or the like of the insulating paper. It is desirable that the value of the ratio, k, lie in a range of 40% to 90% or so, for example. Usually, as the ratio, k, increases, the resistivity, $\rho$, increases.

In addition, when the insulating layer has, in the vicinity of the superconducting conductor layer, a high $\in$ (dielectric constant) layer that has a dielectric constant higher than that of the other portion, not only can the DC voltage-withstanding property be improved but also the impulse voltage-withstanding property can be improved. The values of dielectric constant, $\in$, (at 20° C.) are summarized below:
 (a) ordinary kraft paper: 3.2 to 4.5 or so
 (b) composite paper with a ratio, k, of 40%: 2.8 or so
 (c) composite paper with a ratio, k, of 60%: 2.6 or so
 (d) composite paper with a ratio, k, of 80%: 2.4 or so.

In particular, it is desirable to form the insulating layer by using composite paper that has a high ratio, k, and that incorporates kraft paper having a rather high air impermeability, because this structure is excellent in both DC and impulse withstand voltages.

In addition to the above-described $\rho$ grading, the insulating layer may be structured such that as its radial position moves toward the innermost portion, the dielectric constant, $\in$, increases, and as the radial position moves toward the outermost portion, the dielectric constant, $\in$, decreases. This $\in$ grading, also, is formed radially throughout the insulating layer. As described above, by performing the $\rho$ grading, a superconducting cable of the present invention becomes a cable having excellent DC property, rendering itself suitable for DC transmission. On the other hand, at present, most of the transmission lines are structured as AC systems. In view of the future transition of transmission systems from AC to DC, it can be considered that before the transition to the DC transmission, there exists a case where the AC transmission is carried out by transiently using a cable of the present invention. For example, there will be a case in which although part of the cable in a transmission line is replaced with a superconducting cable of the present invention, the remaining portion is still composed of an AC transmission cable. Another case is conceivable in which although the AC transmission cable in a transmission line is replaced with a superconducting cable of the present invention, the power-transmitting apparatuses connected to the cable still remain for the AC use. In this case, first, AC transmission is transiently performed using the cable of the present invention, and then, finally, the transition to DC transmission will be performed. Therefore, it is desirable that a cable of the present invention not only have an excellent DC property but also be designed by considering the AC property. When the AC property, also, is taken into consideration, a cable having an excellent property against impulse voltage, such as surge voltage, can be structured by employing an insulating layer that increases its dielectric constant, $\in$, as its radial position moves toward the innermost portion and decreases its dielectric constant, $\in$, as its radial position moves toward the outermost portion. At a later time, when the foregoing transient period is finished to commence the DC transmission, the cable of the present invention used in the transient period can be used as the DC cable without any modification. In other words, a cable of the present invention structured not only by the $\rho$ grading but also by the $\in$ grading can be suitably used as an AC/DC cable.

Usually, the above-described PPLP (registered trademark) has a property such that when the ratio, k, is increased, the resistivity, $\rho$, is increased and the dielectric constant, $\in$, is decreased. Consequently, when the insulating layer is structured in such a way that as the radial position moves toward the outermost portion, PPLP (registered trademark) having a higher ratio, k, is used, the insulating layer can have a property such that as the radial position moves toward the outermost portion, the resistivity, $\rho$, is increased and concurrently the dielectric constant, $\in$, is decreased.

On the other hand, kraft paper generally has a property such that when the air impermeability is increased, the resistivity, $\rho$, is increased and the dielectric constant, $\in$, is also increased. Consequently, when only kraft paper is used, it is difficult to structure the insulating layer in such a way that as the radial position moves toward the outermost portion, the resistivity, $\rho$, is increased and concurrently the dielectric constant, $\in$, is decreased. Consequently, when kraft paper is used, it is desirable that the insulating layer be structured by combining with composite paper. For example, it is recommended that a kraft-paper layer be formed at the innermost portion of the insulating layer and that a PPLP layer be formed at the outer side of the kraft-paper layer. In this case, the PPLP layer has a resistivity, $\rho$, higher than that of the kraft-paper layer, and at the same time, the PPLP layer has a dielectric constant, $\in$, lower than that of the kraft-paper layer.

The outer superconducting layer is provided on the above-described insulating layer. As with the foregoing superconducting conductor layer, the outer superconducting layer is formed by using a superconducting material. The superconducting material to be used for the outer superconducting layer may be a material similar to that used for forming the foregoing superconducting conductor layer. The outer superconducting layer is placed at the ground potential. When a superconducting cable of the present invention is used to perform bipolar transmission, usually, the positive-pole current and the negative-pole current have nearly the same magnitude and cancel out to each other. Consequently, the outer superconducting layer, which functions as the neutral-line layer, is almost free from voltage application. However, when an imbalance occurs between the positive and negative poles, the imbalanced current flows through the outer superconducting layer. In addition, when the bipolar trans-mission is switched to the unipolar transmission due to an abnormal condition in one pole, a current comparable to the transmission current will flow through the outer superconducting layer because the outer superconducting layer is used to act as the return line of the unipolar transmission. In view of these circumstances, in the present invention, the outer superconducting layer is formed with a superconducting material. It is desirable that a protecting layer acting also as an insulating layer be provided on the outer circumference of the outer superconducting layer.

In addition, a semiconducting layer may be formed at the inner circumference, the outer circumference, or both of the insulating layer. More specifically, it may be formed between the superconducting conductor layer and the insulating layer, between the insulating layer and the outer superconducting layer, or both. When the inner semiconducting layer, which is the former, or the outer semiconducting layer, which is the latter, is formed, the superconducting conductor layer or the outer superconducting layer is brought into increased contact with the insulating layer. As a result, the deterioration accompanying the generation of partial discharge or the like will be suppressed.

Two cable cores having the above-described structure are prepared. By twisting together the two cores, a superconducting cable of the present invention can have a structure that can provide an allowance for contraction when the cable is cooled. As the structure provided with an allowance for contraction, i.e., as the structure for absorbing the amount of thermal contraction, the cores may be twisted together by giving a slack to the cores, for example. The slack can be given, for example, by twisting the cores together with a spacer placed between the cores and subsequently removing the spacer when the twisted cores are housed in an heat-insulated pipe (or when the heat-insulated pipe is formed on the twisted cores). The spacer may be formed of, for example, a sheet of felt having a thickness of about 5 mm. It is recommendable to properly vary the thickness of the spacer according to the diameter of the cable core.

A superconducting cable of the present invention is structured by twisting together the above-described two cores and housing the twisted body in an heat-insulated pipe. The heat-insulated pipe may have a structure in which, for example, a dual-pipe structure is composed of an outer pipe and an inner pipe, a heat-insulating material is placed between the two pipes, and the space between the outer and inner pipes is evacuated in vacuum. In the inner pipe, the space enclosed by the outer surface of the cable cores and the inner surface of the inner pipe is filled with a coolant, such as liquid nitrogen, for cooling the cable cores. The space is used as the channel for the coolant. An anticorrosion covering may be provided on the outer circumference of the heat-insulated pipe by using a resin such as polyvinyl chloride.

It is desirable to have a structure in which the coolant channel in the inner pipe of the above-described heat-insulated pipe is used as an outward channel of the coolant, and a return channel of the coolant is provided separately, because this structure reduces the intruding heat. As the return channel of the coolant, a coolant-circulating pipe may be used. It is desirable to have a structure in which the coolant-circulating pipe is twisted together with the two cores, because it is easy to place the coolant-circulating pipe in the heat-insulated pipe. In order not to increase the cable diameter by the presence of the coolant-circulating pipe, the coolant-circulating pipe is designed such that it has a diameter less than that of the core so that the envelope circle of the two cores and the coolant-circulating pipe can have the same diameter as that of the envelope circle of the two cores. The number of coolant-circulating pipes described above may be one or two or even more.

It is desirable that the foregoing coolant-circulating pipe have an expanding-and-contracting property that enables the pipe to contract at the time the cable is cooled. As a coolant-circulating pipe having an expanding-and-contracting property, it is desirable to use, for example, a corrugated pipe made of metallic material, such as stainless steel, which has excellent strength even at the coolant temperature. When only two cores are twisted together, a slack is needed for contracting at the time the cable is cooled. However, when a coolant-circulating pipe having an expanding-and-contracting property is used, the coolant-circulating pipe may be twisted together with two cores without providing the slack. The reason is that even when the slack is not secured (when only two cores are twisted together, a slack is needed for contracting, as described above), the expanding-and-contracting property of the coolant-circulating pipe itself can absorb the amount of contraction. In addition, a protecting layer may be provided on the outer circumference of the coolant-circulating pipe by helically lapping kraft paper and the like. By providing the protecting layer, the coolant-circulating pipe can be prevented from being brought into contact with the core or the heat-insulated pipe. As a result, the damaging of them and other problems can be suppressed.

A superconducting cable of the present invention having the above-described structure can be used for unipolar transmission by using the following arrangements:
 (a) the superconducting conductor layers provided in both cores are used as the outward line; and
 (b) the outer superconducting layers provided in both cores are used as the return line.
In addition, the cable can also be used for bipolar transmission by using the following arrangements:
 (a) the superconducting conductor layer provided in one of the cores is used to perform the transmission for one pole; either the positive pole or the negative pole;
 (b) the superconducting conductor layer provided in the other core is used to perform the transmission for the other pole; and
 (c) the outer superconducting layers provided in the individual cores are used as the neutral line.
Furthermore, during the performing of the bipolar transmission, one pole may suffer an abnormal condition in the superconducting conductor layer for the pole or in the DC-AC converter connected to the cable, for example. In this case, when the pole is required to stop the power transmission due to this abnormality, the core for the other pole, which is sound, can be used to carry out unipolar transmission. More specifically, the superconducting conductor layer of the core for the sound pole can be used as the outward line and the outer superconducting layer of the same core as the return line. In either of the transmission systems, whether unipolar or bipolar transmission, the outer superconducting layers of both cores are placed at the ground potential.

A superconducting cable of the present invention can be suitably used not only for DC transmission but also for AC transmission by providing an insulating layer structured with the $\in$ grading, as described above. When single-phase AC transmission is performed, one superconducting cable of the present invention may be used. In this case, the superconducting conductor layers of the individual cores may be used for the power transmission for the phase with the outer superconducting layers of the individual cores being used as the shield layers. Alternatively, the superconducting conductor layer of either one of the cores may be used for the power transmission for the phase with the outer superconducting layer of the same core being used as the shield layer and with the remaining core being used as the spare core. When this superconducting cable is used for DC transmission after being used for single-phase AC transmission, this cable may be used either for unipolar trans-mission or for bipolar transmission. When three-phase AC transmission is performed, two or three superconducting cables of the present invention are prepared so that the total number of cores can become at least three. When two cables are used, the total number of cores becomes four. Consequently, it is recommended that one core be used as the spare core, that the superconducting conductor layers of the remaining three cores be used for the transmission for the individual phases, and that the outer superconducting layers be used as the shield layers. When three cables are used, it is recommended that the superconducting conductor layers of the individual cables be used for the transmission for the individual phases and that the outer superconducting layers be used as the shield layers. In other words, it is recommended that two cores be used for the transmission for one phase. When these superconducting cables are used for DC transmission after being used for three-phase AC transmission, the individual cables may be used either for unipolar transmission or for bipolar transmission.

Effect of the Invention

A superconducting cable of the present invention having the above-described structure has a further decreased cable diameter. Nevertheless, it can be used for bipolar transmission with one cable. In addition, even when one of the poles creates an abnormal condition, the transmission can be performed by switching from the bipolar transmission to unipolar transmission. Moreover, a superconducting cable of the present invention is provided with a coolant-circulating pipe without increasing the cable diameter. This structure can decrease the intruding heat.

In addition, in the core provided in a superconducting cable of the present invention, by performing the $\rho$ grading in the insulating layer, the thicknesswise distribution of the DC electric field can be flattened throughout the insulating layer. As a result, the DC voltage-withstanding property is improved, and consequently the thickness of the insulating layer can be decreased. Therefore, the cable diameter can be further decreased. In addition to the $\rho$ grading, by providing an insulating layer having high $\in$ in the vicinity of the superconducting conductor layer, the impulse voltage-withstanding property can also be improved in addition to the above-described improvement in the DC voltage-withstanding property. In particular, by structuring the insulating layer in such a way that as its radial position moves toward the innermost portion, the $\in$ increases, and as the radial position moves toward the outermost portion, the $\in$ decreases, a superconducting cable of the pre-sent invention can be a cable also having an excellent AC electric property. Therefore, a superconducting cable of the present invention can not only be suitably used for both of the DC transmission and AC transmission but also be suitably used during a transient period in which the transmission system is switched between AC and DC.

BEST MODE FOR CARRYING OUT THE INVENTION

Embodiments of the present invention are explained below.

EXAMPLE 1

Figure 1A:
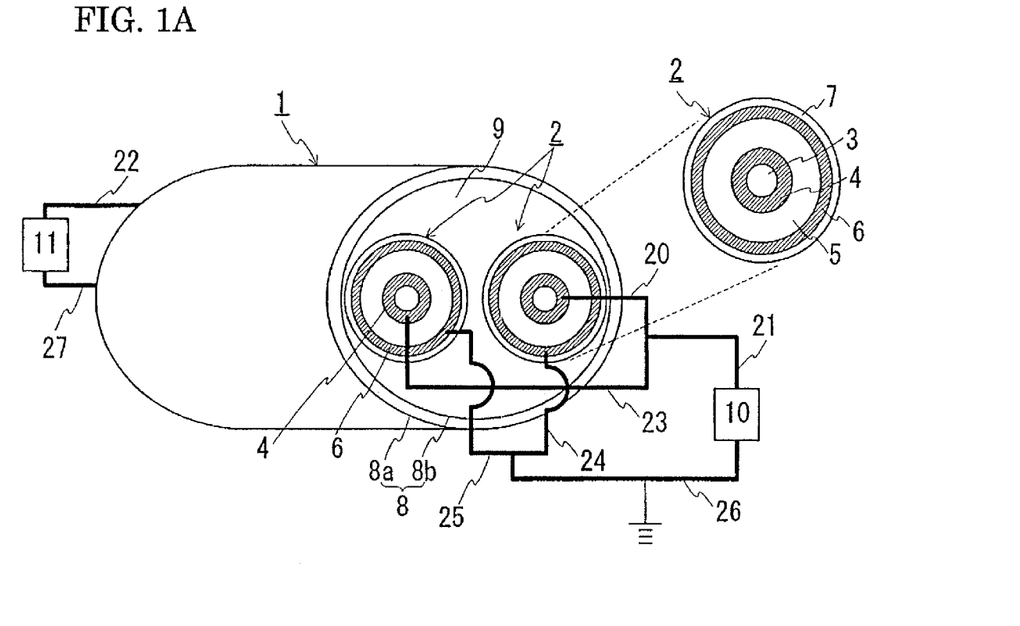
FIG. 1(A) is a schematic configuration diagram showing a state in which a DC transmission line is constructed by using a superconducting cable of the present invention.
Figure 1B:
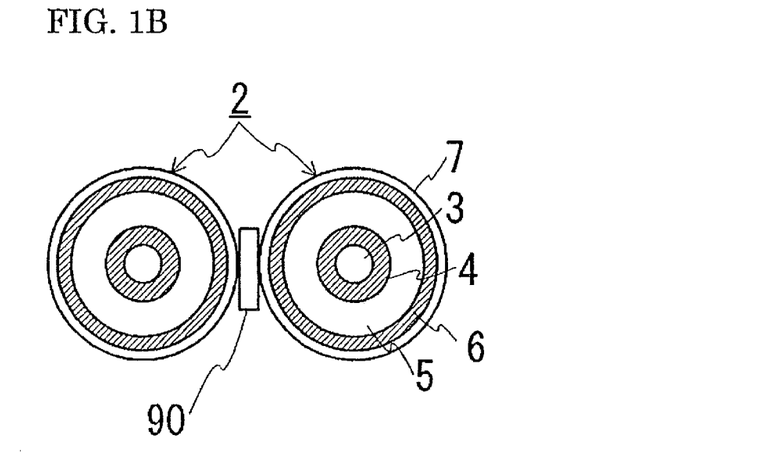
FIG. 1(B) is a schematic cross-sectional view showing a state in which a spacer is placed between the cable cores in the superconducting cable.

FIG. 1(A) is a schematic configuration diagram showing a state in which a DC transmission line for unipolar transmission is constructed by using a superconducting cable of the present invention. (B) is a schematic cross-sectional view showing a state in which a spacer is placed between the cable cores in the superconducting cable. In the following drawing, the same sign represents the same item. A superconducting cable 1 has a structure in which two cable cores 2, each of which has a superconducting conductor layer 4 and an outer superconducting layer 6 both made of a superconducting material, are twisted together and housed in a heat-insulated pipe 8. Each of the cable cores 2 is provided with a former 3, the superconducting conductor layer 4, an insulating layer 5, the outer superconducting layer 6, and a protecting layer 7 in this order from the center.

In this example, the superconducting conductor layer 4 and the outer superconducting layer 6 were formed by using Bi-2223-based superconducting tape-shaped wires (Ag—Mn-sheathed tape-shaped wires). The superconducting conductor layer 4 was structured by helically winding the foregoing superconducting tape-shaped wires on the outer circumference of the former 3. The outer superconducting layer 6 was structured by the same method as above on the insulating layer 5. The former 3 was formed by stranding a plurality of copper wires. A cushion layer (not shown) made of insulating paper was formed between the former 3 and the superconducting conductor layer 4. The insulating layer 5 was structured on the outer circumference of the superconducting conductor layer 4 by helically lapping semisynthetic insulating paper (PPLP: registered trademark, produced by Sumitomo Electric Industries, Ltd.). The insulating layer 5 was provided so as to have an insulating strength needed to insulate between the superconducting conductor layer 4 and the ground. The protecting layer 7 was provided on the outer circumference of the outer superconducting layer 6 by helically lapping insulating paper.

In this example, two cable cores 2 each having the former 3, the superconducting conductor layer 4, the insulating layer 5, the outer superconducting layer 6, and the protecting layer 7 were prepared. The two cable cores 2 are twisted together with a slack so as to have an allowance for contraction needed for thermal contraction and housed in the heat-insulated pipe 8. In this example, the heat-insulated pipe 8 was formed of corrugated stainless steel pipe. As with the conventional superconducting cable shown in FIG. 4, the heat-insulated pipe 8 had a dual-pipe structure composed of an outer pipe 8a and an inner pipe 8b, between which a heat-insulating material (not shown) was placed in multiple layers. The space between the dual pipes was evacuated in vacuum. Thus, the heat-insulated pipe 8 had an evacuated multilayer heat-insulated structure. A space 9 enclosed by the inner pipe 8b and the two cable cores 2 forms a channel for a coolant such as liquid nitrogen. An anticorrosion covering (not shown) made of polyvinyl chloride was formed on the outer circumference of the heat-insulated pipe 8. In addition, the two cable cores 2 were twisted together with a slack that was formed by placing a spacer 90 between the cores 2 as shown in FIG. 1(B) and then by removing the spacer 9 at the time the twisted body was housed in the heat-insulated pipe 8 (or at the time the heat-insulated pipe 8 was formed on the twisted body). In this example, the spacer 90 was formed of a sheet of felt having a thickness of 5 mm with a rectangular cross section.

The superconducting cable 1 of the present invention having the above-described structure can be used for DC transmission, more specifically, whether bipolar transmission or unipolar transmission. First, the case where the unipolar transmission is performed is explained. To perform the unipolar transmission, it is recommendable to construct a transmission line as shown in FIG. 1(A). More specifically, one end of the superconducting conductor layer 4 provided in the core 2 at the right in FIG. 1(A) is connected to a DC-AC converter 10, which is connected to an AC system (not shown), through a lead 20 and a lead 21. The other end of the same superconducting conductor layer 4 is connected to a DC-AC converter 11, which is connected to an AC system (not shown), through a lead 22. Similarly, one end of the superconducting conductor layer 4 provided in the core 2 at the left in FIG. 1(A) is connected to the DC-AC converter 10 through a lead 23 and the lead 21. The other end of the same superconducting conductor layer 4 is connected to the DC-AC converter 11 through the lead 22. On the other hand, the outer superconducting layers 6 of both cores 2 are connected to the DC-AC converter 10 through a lead 24, a lead 25, and a lead 26 and are connected to the DC-AC converter 11 through a lead 27. In this example, the lead 26 is grounded. This grounding places the outer superconducting layers 6 at the ground potential. In this example, a single-end grounding is employed. Nevertheless, a both-end grounding may be employed by grounding the lead 27 also. The leads 20 to 27 electrically connect the superconducting conductor layers 4 and the outer superconducting layers 6 with the DC-AC converters 10 and 11.

A DC transmission line provided with the foregoing configuration can be used to perform a unipolar transmission by using the superconducting conductor layers 4 provided in both cores 2 as the outward line, which carries the unipolar current, and by using the outer superconducting layers 6 provided in both cores 2 as the return line, which carries the return current. In addition, the superconducting cable is formed by twisting together the two cable cores with a slack. Consequently, the slack can absorb the amount of thermal contraction at the time of the cooling. Furthermore, the superconducting cable 1 has a smaller number of cores than that of the conventional cable. Therefore, the cable can decrease the cable diameter.

EXAMPLE 2

Figure 2A:
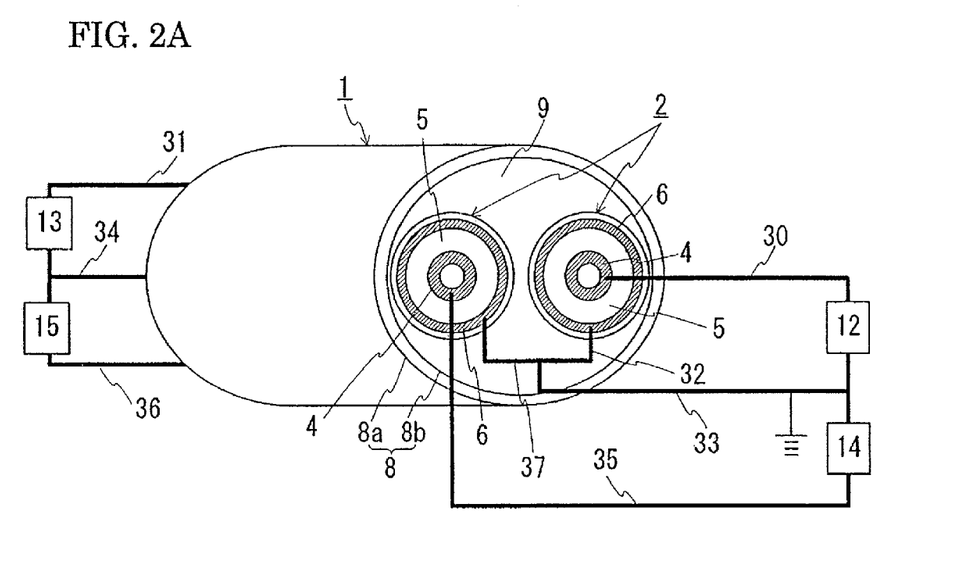
FIG. 2(A) is a schematic configuration diagram showing a state in which a DC transmission line for bipolar transmission is constructed by using a superconducting cable of the present invention.
Figure 2B:
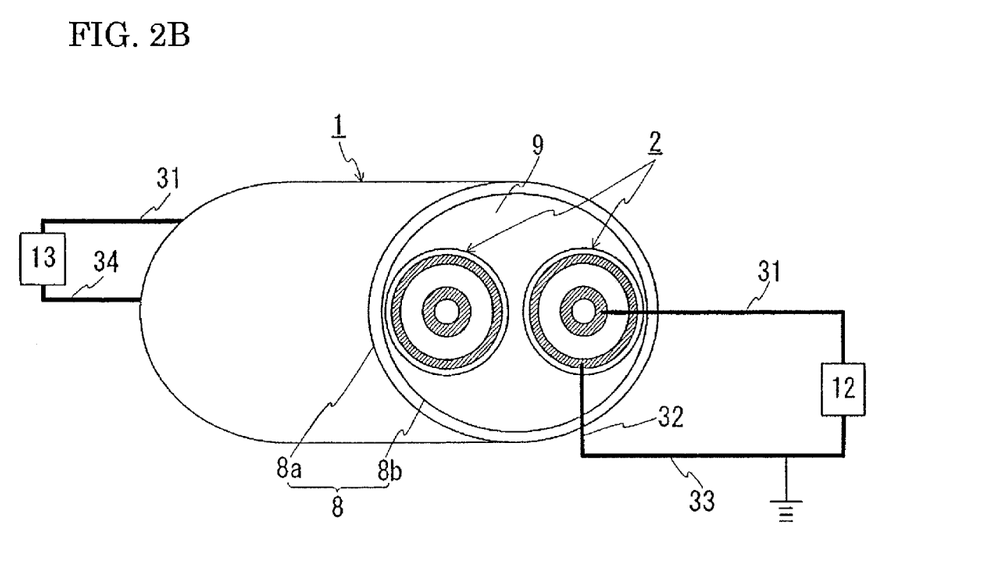
FIG. 2(B) is a schematic configuration diagram showing a state in which a DC transmission line for unipolar transmission is constructed by using the superconducting conductor layer and outer superconducting layer of one of the cores.

Next, the case where a bipolar transmission is performed is explained. FIG. 2(A) is a schematic configuration diagram showing a state in which a DC transmission line for bipolar transmission is constructed by using a superconducting cable of the present invention. FIG. 2(B) is a schematic configuration diagram showing a state in which a DC transmission line for unipolar transmission is constructed by using the superconducting conductor layer and outer superconducting layer of one of the cores. The superconducting cable 1 used in Example 1 can also be used for bipolar transmission. To perform the bipolar transmission, it is recommendable to construct a transmission line as shown in FIG. 2(A). More specifically, one end of the superconducting conductor layer 4 provided in one of the cores 2 (in FIG. 2(A), the core 2 at the right) is connected to a DC-AC converter 12, which is connected to an AC system (not shown), through a lead 30. The other end of the same superconducting conductor layer 4 is connected to a DC-AC converter 13, which is connected to an AC system (not shown), through a lead 31. Similarly, one end of the outer superconducting layer 6 provided in the same core 2 is connected to the DC-AC converter 12 through a lead 32 and a lead 33. The other end of the same outer superconducting layer 6 is connected to the DC-AC converter 13 through a lead 34. On the other hand, one end of the superconducting conductor layer 4 provided in the other core 2 (in FIG. 2(A), the core 2 at the left) is connected to the DC-AC converter 14, which is connected to an AC system (not shown), through a lead 35. The other end of the same superconducting conductor layer 4 is connected to a DC-AC converters 15, which is connected to an AC system (not shown), through a lead 36. Similarly, one end of the outer superconducting layer 6 provided in the same core 2 is connected to the DC-AC converter 14 through a lead 37 and the lead 33. The other end of the same outer superconducting layer 6 is connected to the DC-AC converter 15 through the lead 34. The lead 33 is grounded. This grounding places the outer superconducting layers 6 at the ground potential. In this example, a single-end grounding is employed by grounding only the lead 33. Nevertheless, a both-end grounding may be employed by grounding the lead 34 also. The leads 30 to 37 electrically connect the superconducting conductor layers 4 and the outer superconducting layers 6 with the DC-AC converters 12, 13, 14, and 15.

The above-described configuration makes up a positive-pole circuit in the forward direction composed of the DC-AC converter 13, the lead 31, the superconducting conductor layer 4 of the core 2 at the right in FIG. 2(A), the lead 30, the DC-AC converter 12, the lead 33, the lead 32, the outer superconducting layer 6, and the lead 34. On the other hand, the configuration also makes up a negative-pole circuit in the forward direction composed of the DC-AC converter 15, the lead 36, the superconducting conductor layer 4 of the core 2 at the left in FIG. 2(A), the lead 35, the DC-AC converter 14, the lead 33, the lead 37, the outer superconducting layer 6, and the lead 34. The positive- and negative-pole circuits shown in the forward direction in the above enable the performing of the bipolar transmission. In this configuration, the outer superconducting layers 6 of both cores 2 are used not only as the neutral-line layer but also to circulate an imbalanced current between the positive and negative poles or an abnormal current. In this example, in FIG. 2(A), the core at the right is used for the positive pole and the core at the left for the negative pole. Nevertheless, the usage may be reversed, of course.

Even when one of the poles stops the power transmission using its superconducting conductor layer due to an abnormality in the superconducting conductor layer or DC-AC converter for the pole, a unipolar transmission can be performed by using the superconducting conductor layer for the sound pole. For example, in FIG. 2(A), when the core 2 at the left, the DC-AC converters 14 and 15, or the like creates an abnormal condition, i.e., when the negative pole creates an abnormal condition, the transmission using the core 2 at the left in FIG. 2(A) is stopped. In this case, as shown in FIG. 2(B), a transmission line for unipolar transmission is formed by using the other core 2 (in FIG. 2(A), the core 2 at the right). More specifically, the unipolar transmission can be performed by using the superconducting conductor layer 4 of the core 2 as the outward line and using the outer superconducting layer 6 of the same core as the return line. In this example, the case where the negative pole creates an abnormality is explained. Nevertheless, when the positive pole creates an abnormality, also, a similar step can be taken. In this case, the unipolar trans-mission can be performed by using the superconducting conductor layer 4 of the other core 2 (in FIG. 2(A), the core 2 at the left) as the outward line and using the outer superconducting layer 6 of the same core as the return line.

As explained above, a superconducting cable of the present invention can be used for both the bipolar transmission and unipolar transmission by using one cable. In particular, it is specified that the number of cable cores provided in one cable is two. Therefore, the cable diameter can be further decreased in comparison with the structure having three cores.

As described earlier, for performing DC transmission, when the insulating layer 5 is structured with the $\rho$ grading such that as the radial position moves toward the innermost portion of the insulating layer, the resistivity decreases, and as the radial position moves toward the outermost portion, the resistivity increases, the distribution of the DC electric field can be flattened thicknesswise in the insulating layer. Consequently, the thickness of the insulating layer can be further decreased. The resistivity can be varied by using different groups of PPLP (registered trademark), the different groups each having a different ratio, k. As the ratio, k, increases, the resistivity tends to increase. In addition, when the insulating layer 5 is provided with a high $\in$ layer in the vicinity of the superconducting conductor layer 4, its impulse voltage-withstanding property can be improved in addition to the improvement in the DC voltage-withstanding property. The high $\in$ layer can be formed by using PPLP (registered trademark) having a low ratio, k, for example. In this case, the high $\in$ layer becomes to be a low $\rho$ layer also. Furthermore, in addition to the above-described $\rho$ grading, when the insulating layer 5 is formed such that as the radial position moves toward the innermost portion, the dielectric constant, $\in$, increases, and as the radial position moves toward the outermost portion, the dielectric constant, $\in$, decreases, the insulating layer also has excellent AC property. Therefore, the superconducting cable 1 can also be suitably used for AC transmission. For example, by using different groups of PPLP (registered trademark), the different groups each having a different ratio, k, as follows, an insulating layer can be formed that has three different steps of resistivity and dielectric constant. It is recommended that the following three layers be provided in the following order from inside (X and Y each represent a constant):

A low $\rho$ layer:ratio (k):60%, resistivity ($\rho$)(at 20° C.): X$\Omega$·cm, dielectric constant ($\in$):Y;

A middle $\rho$ layer:ratio (k):70%, resistivity ($\rho$)(at 20° C.): about 1.2X$\Omega$·cm, dielectric constant ($\in$) about 0.95 Y; and A high $\rho$ layer:ratio (k):80%, resistivity ($\rho$)(at 20° C.): about 1.4X$\Omega$·cm, dielectric constant ($\in$):about 0.9Y.

When the superconducting cable 1 is used for performing three-phase AC transmission, it is recommendable to use two or three superconducting cables 1. When two cables 1 are used, it is recommended that of four cores 2 of the two cables 1, one core 2 be used as the spare core, the superconducting conductor layers 4 of the remaining three cores 2 be used for the transmission for the individual phases, and the outer superconducting layers 6 of these three cores 2 be used as the shield layers. When three cables 1 are used, the individual cables 1 are used for the transmission for the individual phases. More specifically, the two cores 2 provided in each cable 1 are used for the transmission for one phase. In this case, the superconducting conductor layers 4 of the two cores 2 provided in each cable 1 are used for the transmission for the corresponding phase, and the outer superconducting layers 6 provided at the outer side of these superconducting conductor layers 4 are used as the shield layers. When the superconducting cable 1 is used for performing single-phase AC transmission, it is recommendable to prepare one superconducting cable 1, to use the superconducting conductor layers 4 of the individual cores 2 for the transmission for the same phase, and to use the outer superconducting layers 6 provided at the outer side of these superconducting conductor layers 4 as the shield layers.

The superconducting cable 1 can be used for performing DC transmission, such as the above-described unipolar transmission and bipolar transmission, after being used for performing the above-described AC transmission. As described above, a superconducting cable of the present invention having an insulating layer structured by the $\rho$ grading and $\in$ grading can be suitably used as a DC/AC cable. The matter concerning the $\rho$ grading and $\in$ grading is also applied to the below-described Example 3.

EXAMPLE 3

Figure 3:
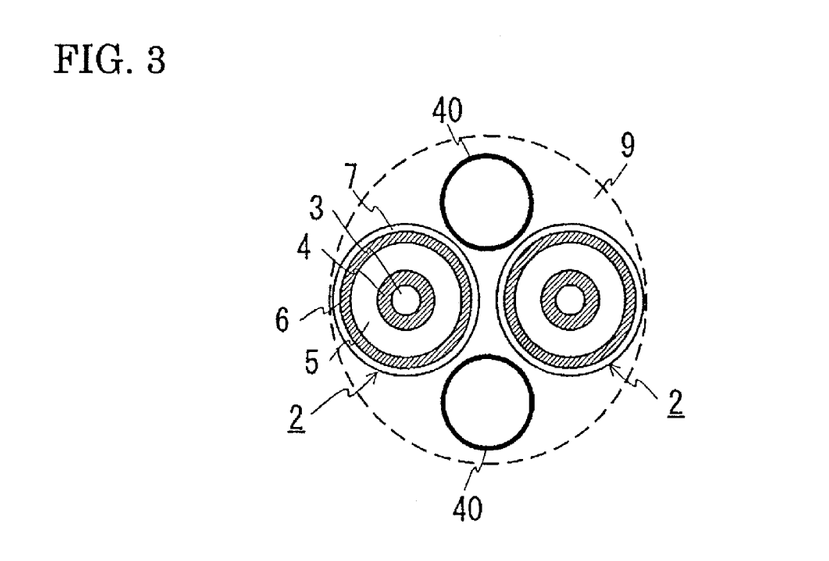
FIG. 3 is a schematic cross-sectional view showing a superconducting cable of the present invention formed by twisting together two cable cores and coolant-circulating pipes.

Next, an explanation is given to a structure provided with both an outward channel of the coolant and a return channel of the coolant. FIG. 3 is a schematic cross-sectional view showing a superconducting cable of the present invention formed by twisting together two cable cores and coolant-circulating pipes. In the above-described Examples 1 and 2, an explanation is given to a structure in which the inside of the inner pipe of the heat-insulated pipe is used as a coolant channel. However, as shown in FIG. 3, coolant-circulating pipes 40 may be provided separately so that a space 9 in the inner pipe can be used as an outward channel of the coolant and so that the inside of the coolant-circulating pipes 40 can be used as a return channel of the coolant. When the outward and return channels of the coolant are provided as described above, the intruding heat can be decreased.

In this example, two coolant-circulating pipes 40 were prepared to form a structure in which two cable cores 2 and the two coolant-circulating pipes 40 were twisted together. In particular, in this example, as the coolant-circulating pipes 40, a corrugated pipe made of stainless steel was used. When a flexible pipe such as a corrugated pipe is used, the expanding-and-contracting property of the coolant-circulating pipes themselves can absorb the amount of contraction at the time the cable is cooled. Consequently, when twisted together with the two cable cores 2, the coolant-circulating pipes 40 were twisted without having the earlier-described slack for contraction.

The coolant-circulating pipes 40 were designed to have a diameter smaller than that of the cable cores 2. In addition, as shown in FIG. 3, the envelope circle (the circle drawn by a broken line in FIG. 3) of the two coolant-circulating pipes 40 and the two cores 2 was designed to have the same diameter as that of the envelope circle of the two cores 2. Therefore, even when provided with the coolant-circulating pipes 40 in addition to the two cable cores 2, this superconducting cable has a cable diameter not greater than that of the superconducting cable 1 shown in Examples 1 and 2, which has no coolant-circulating pipes 40. In this example, two coolant-circulating pipes 40 were used. However, the number of coolant-circulating pipes may be one or three or even more. Nevertheless, the size of the coolant-circulating pipe must be selected so that the envelope circle of the coolant-circulating pipe or pipes and two cable cores can have the same diameter as that of the envelope circle of the two cores.

INDUSTRIAL APPLICABILITY

A superconducting cable of the present invention is suitable for use for an electrical line for performing power transmission. In particular, a superconducting cable of the present invention can be used suitably not only for a means of transmitting DC power but also for transmitting AC power in a transient period in which the transmission system is switched from AC to DC. Furthermore, a DC transmission system of the present invention can be implemented suitably at the time the DC transmission is performed by using the above-described superconducting cable of the present invention.

Explanation of the Sign

1: Superconducting cable; 2: Cable core; 3: Former; 4: Superconducting conductor layer; 5: Insulating layer; 6: Outer superconducting layer; 7: Protecting layer; 8: Heat-insulated pipe; 8*a*: Outer pipe; 8*b*: Inner pipe; 9: Space; 10 to 15: DC-AC converter; 20 to 27, 30 to 37: Lead; 40: Coolant-circulating pipe; 90: Spacer; 100: Superconducting cable for three-phase AC use; 101: Heat-insulated pipe; 101*a*: Outer pipe; 101*b*: Inner pipe; 102: Cable core; 103: Space; 104: Anticorrosion covering; 200: Former; 201: Superconducting conductor layer; 202: Insulating layer; 203: Superconducting shield layer; 204: Protecting layer.

The invention claimed is:

1. A superconducting cable formed by twisting together a plurality of cable cores, each having:
   (a) a superconducting conductor layer;
   (b) an insulating layer provided on the outer circumference of the superconducting conductor layer; and
   (c) an outer superconducting layer provided on the outer circumference of the insulating layer;
   the number of cable cores being two,
   wherein the insulating layer is:
   (a) formed by a combination of insulating paper and composite paper composed of insulating paper and plastic film; and
   (b) structured by using a $\rho$ grading such that as the radial position moves toward the innermost portion of the insulating layer, the resistivity decreases, and as the radial position moves toward the outermost portion, the resistivity increases in order to flatten the radial distribution of a DC electric field in the insulating layer.

2. A superconducting cable as defined by claim 1, the superconducting cable having a two-core-twisted structure that has an allowance for contraction when the cable is cooled.

3. A superconducting cable as defined by claim 1, the superconducting cable having a structure in which two cores and at least one coolant-circulating pipe are twisted together;
   the at least one coolant-circulating pipe having a diameter less than that of the cores;
   the envelope circle of the two cores and the at least one coolant-circulating pipe having the same diameter as that of the envelope circle of the two cores.

4. A superconducting cable as defined by claim 3, wherein the at least one coolant-circulating pipe:
   (a) has an expanding-and-contracting property that enables the at least one coolant-circulating pipe to contract at the time the cable is cooled; and
   (b) is twisted together with the two cores without having a slack for contracting at the time the cable is cooled.

5. A superconducting cable as defined by claim 4, wherein the at least one coolant-circulating pipe is a corrugated metallic pipe.

6. A superconducting cable as defined by claim 1, wherein the insulating layer has, in the vicinity of the superconducting conductor layer, a high $\in$ layer that has a dielectric constant higher than that of the other portion.

7. A superconducting cable as defined by claim 1, wherein the insulating layer is structured such that as its radial position moves toward the innermost portion, the dielectric constant, $\in$, increases, and as the radial position moves toward the outermost portion, the dielectric constant, $\in$, decreases.

8. A superconducting cable as defined by clam 1, wherein the $\rho$ grading is formed by a combination of different groups of composite paper, the different groups each having a different ratio, k, of the thickness of the plastic film to that of the composite paper.

9. A superconducting cable as defined by claim 8, wherein the different groups of composite paper each having a ratio, k, of at least 60%.

10. A DC transmission system incorporating a superconducting cable as defined by claim 1, the DC transmission system performing a unipolar transmission by using:
    (a) the superconducting conductor layers provided in both cores as an outward line; and
    (b) the outer superconducting layers provided in both cores as a return line.

11. A DC transmission system incorporating a superconducting cable as defined by claim 1, the DC transmission system performing a bipolar transmission by using:
    (a) the superconducting conductor layer provided in one of the two cores to perform the transmission for one pole selected from the group consisting of the positive pole and the negative pole;
    (b) the superconducting conductor layer provided in the other core to perform the transmission for the other pole; and
    (c) the outer superconducting layers provided in both cores as the neutral-line layers.

\* \* \* \* \*